US008235460B2

(12) United States Patent
Plavetich et al.

(10) Patent No.: US 8,235,460 B2
(45) Date of Patent: Aug. 7, 2012

(54) VEHICLE WINDOW ASSEMBLY

(75) Inventors: Richard Plavetich, Laguna Beach, CA (US); Ching Pin Chang, San Diego, CA (US)

(73) Assignee: Nissan North America, Inc., Franklin, TN (US)

(*) Notice: Subject to any disclaimer, the term of this patent is extended or adjusted under 35 U.S.C. 154(b) by 165 days.

(21) Appl. No.: 12/938,204

(22) Filed: Nov. 2, 2010

(65) Prior Publication Data

US 2012/0104790 A1  May 3, 2012

(51) Int. Cl.
*B60J 7/00* (2006.01)

(52) U.S. Cl. .................. 296/215; 296/146.15

(58) Field of Classification Search ............ 296/146.15, 296/146.16, 215, 216.01; 362/503
See application file for complete search history.

(56) References Cited

U.S. PATENT DOCUMENTS

| 4,255,873 | A |   | 3/1981 | Eberle |
| 4,466,657 | A | * | 8/1984 | Kaltz et al. .......... 296/221 |
| 4,892,369 | A |   | 1/1990 | Moss |
| 4,989,956 | A |   | 2/1991 | Wu et al. |
| 6,056,352 | A | * | 5/2000 | Ewing et al. .......... 296/214 |
| 7,030,860 | B1 |  | 4/2006 | Hsu et al. |
| 7,324,095 | B2 |  | 1/2008 | Sharma |
| 7,387,397 | B2 |  | 6/2008 | Konet et al. |
| 7,445,350 | B2 |  | 11/2008 | Konet et al. |
| 7,663,607 | B2 |  | 2/2010 | Hotelling et al. |
| 7,665,869 | B2 |  | 2/2010 | Spazier |
| 2001/0011835 | A1 | * | 8/2001 | De Torbal ............. 296/211 |
| 2004/0245801 | A1 | * | 12/2004 | Gates et al. ............ 296/146.8 |
| 2007/0189027 | A1 | * | 8/2007 | Sakakibara ............ 362/490 |
| 2007/0200387 | A1 | * | 8/2007 | Patterson ............. 296/146.16 |
| 2008/0302014 | A1 |  | 12/2008 | Szczerba et al. |
| 2010/0066130 | A1 | * | 3/2010 | Rashidy et al. ........ 296/216.08 |
| 2011/0071735 | A1 | * | 3/2011 | Witek ..................... 701/49 |
| 2011/0120020 | A1 | * | 5/2011 | Fourel et al. ............. 49/358 |
| 2011/0127807 | A1 | * | 6/2011 | Ludwig et al. .......... 296/216.01 |
| 2011/0128755 | A1 | * | 6/2011 | Ludwig et al. .......... 362/555 |
| 2011/0221237 | A1 | * | 9/2011 | Nakamura et al. ...... 296/216.06 |
| 2011/0227751 | A1 | * | 9/2011 | Kuo et al. ............... 340/689 |
| 2011/0313619 | A1 | * | 12/2011 | Washeleski et al. ...... 701/36 |

FOREIGN PATENT DOCUMENTS

JP  2000-016171 A  1/2000
WO  WO-2010/081142 A1  7/2010

\* cited by examiner

*Primary Examiner* — Lori Lyjak

(74) *Attorney, Agent, or Firm* — Global IP Counselors, LLP

(57) ABSTRACT

A vehicle window assembly includes a vehicle structure, a window panel and a proximity switch. The vehicle structure defines a passenger compartment of a vehicle and a viewing aperture. The window panel is mounted to the vehicle structure and covers the viewing aperture such that a first surface of the window panel faces the passenger compartment of the vehicle structure. The proximity switch overlays a portion of the first surface of the window panel.

20 Claims, 14 Drawing Sheets

VEHICLE WINDOW ASSEMBLY

BACKGROUND

1. Field of the Invention The present invention generally relates to a vehicle window assembly. More specifically, the present invention relates to a vehicle window assembly that includes a proximity switch.

2. Background Information

Vehicles are continually being re-designed and improved to provide better safety features, improved functionality and improved appearance. One area of re-design includes the windows of vehicles. Typically, the glass in vehicle window is transparent, which allows light to pass from one side of the glass to the other side of the glass.

SUMMARY

In view of the state of the known technology, one aspect of the present invention is to provide a vehicle with a vehicle window assembly. The vehicle window assembly includes a vehicle structure, a window panel and a proximity switch. The vehicle structure defines a passenger compartment of a vehicle and a viewing aperture. The window panel is mounted to the vehicle structure and covers the viewing aperture such that a first surface of the window panel faces the passenger compartment of the vehicle structure. The proximity switch overlays a portion of the first surface of the window panel.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
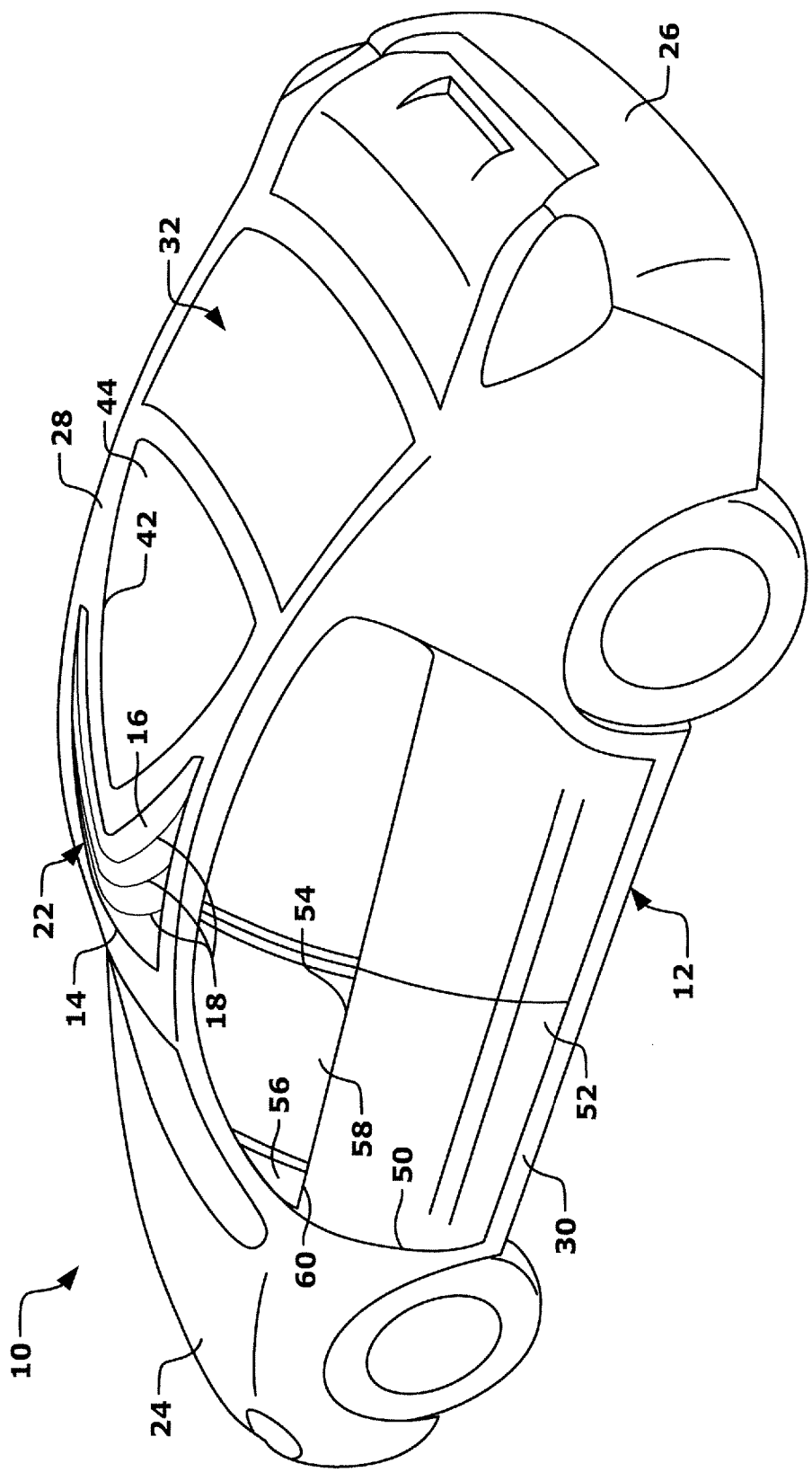
FIG. 1 is a perspective view illustrating a vehicle having a vehicle structure that includes a window assembly with a viewing aperture with a window panel covering the viewing aperture.
Figure 2:
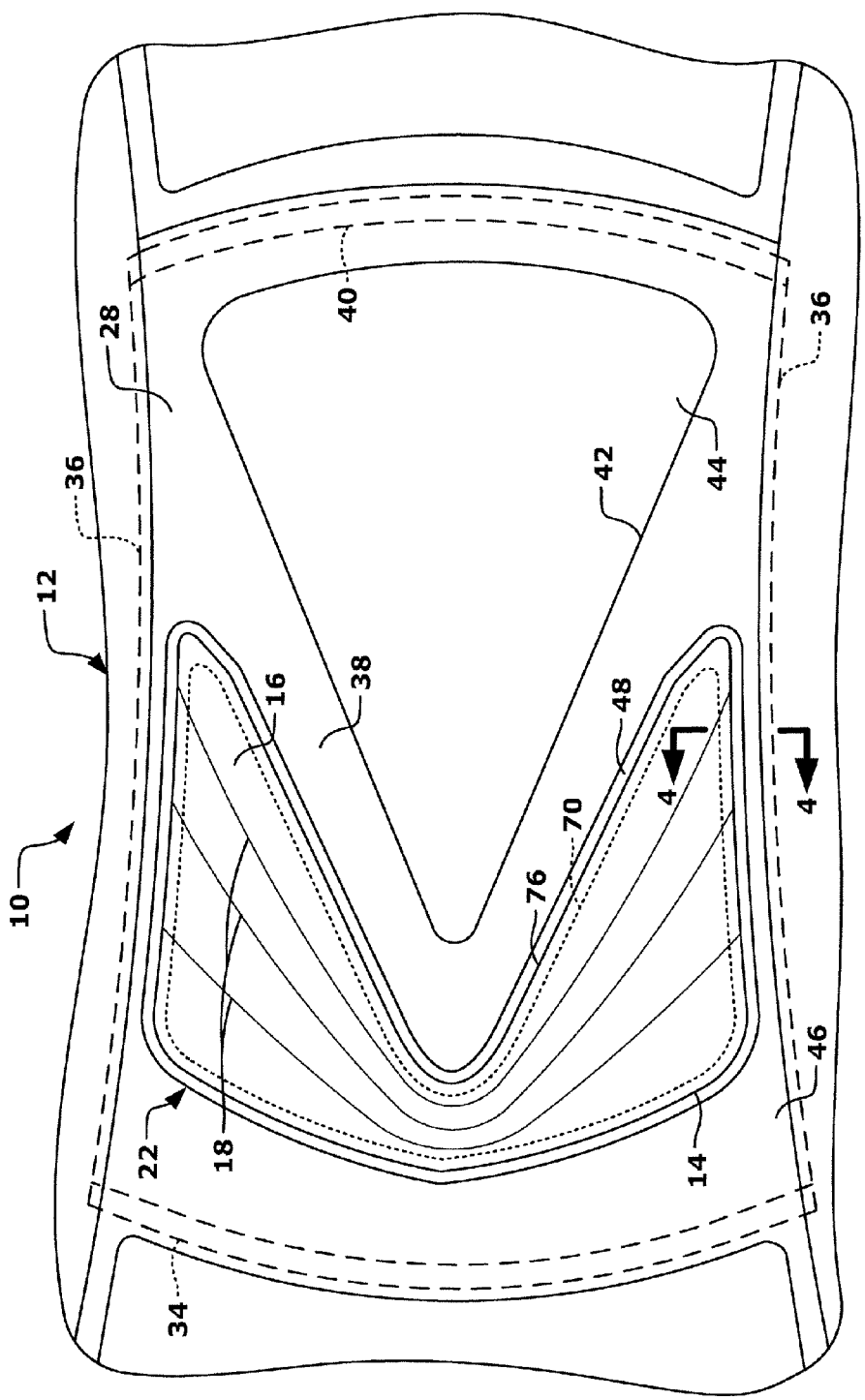
FIG. 2 is a top view of the vehicle showing a roof portion of the vehicle structure that includes the viewing aperture and the window panel of the window assembly, the viewing aperture and window panel also defining a sunroof, the window panel having etched sections in accordance with a first embodiment.

Referring initially to FIGS. 1-4, a vehicle 10 is illustrated in accordance with a first embodiment. As shown in FIG. 1, the vehicle 10 includes a vehicle structure 12 defining a viewing aperture 14 and a window panel 16 mounted to the vehicle structure 12 covering the viewing aperture 14. As indicated in FIG. 2, the window panel 16 includes etched sections 18 that are selectively illuminated by a light source or light sources 20 (shown in FIGS. 3 and 4). The viewing aperture 14, the window panel 16, the etched sections 18 and the light sources 20 define a window assembly 22 (FIG. 4) that is described in greater detail below.

As shown in FIG. 1, the vehicle structure 12 includes, among other things, a front section 24, a rear section 26, a roof section 28 and side sections 30 (only one side section shown in FIG. 1). The vehicle structure 12 further defines a passenger compartment 32 beneath the roof section 28. The passenger compartment 32 is located between the side sections 30, rearward of the front section 28 and forward of the rear section 26 of the vehicle 10. The passenger compartment 32 includes a plurality of conventional features, such as front seats (not shown), rear seats (not shown) and a dashboard (not shown). Since these features are conventional, description of the passenger compartment 32 is omitted for the sake of brevity.

The front section 24 of the vehicle structure 12 includes several conventional elements, such as a front bumper, an engine compartment and a windshield support portion. The rear section 26 of the vehicle structure 12 includes several conventional elements, such as a rear bumper, a rear window support portion and a storage compartment (a trunk). Since these sections of the vehicle 10 are conventional, further description is also omitted for the sake of brevity.

Figure 3:
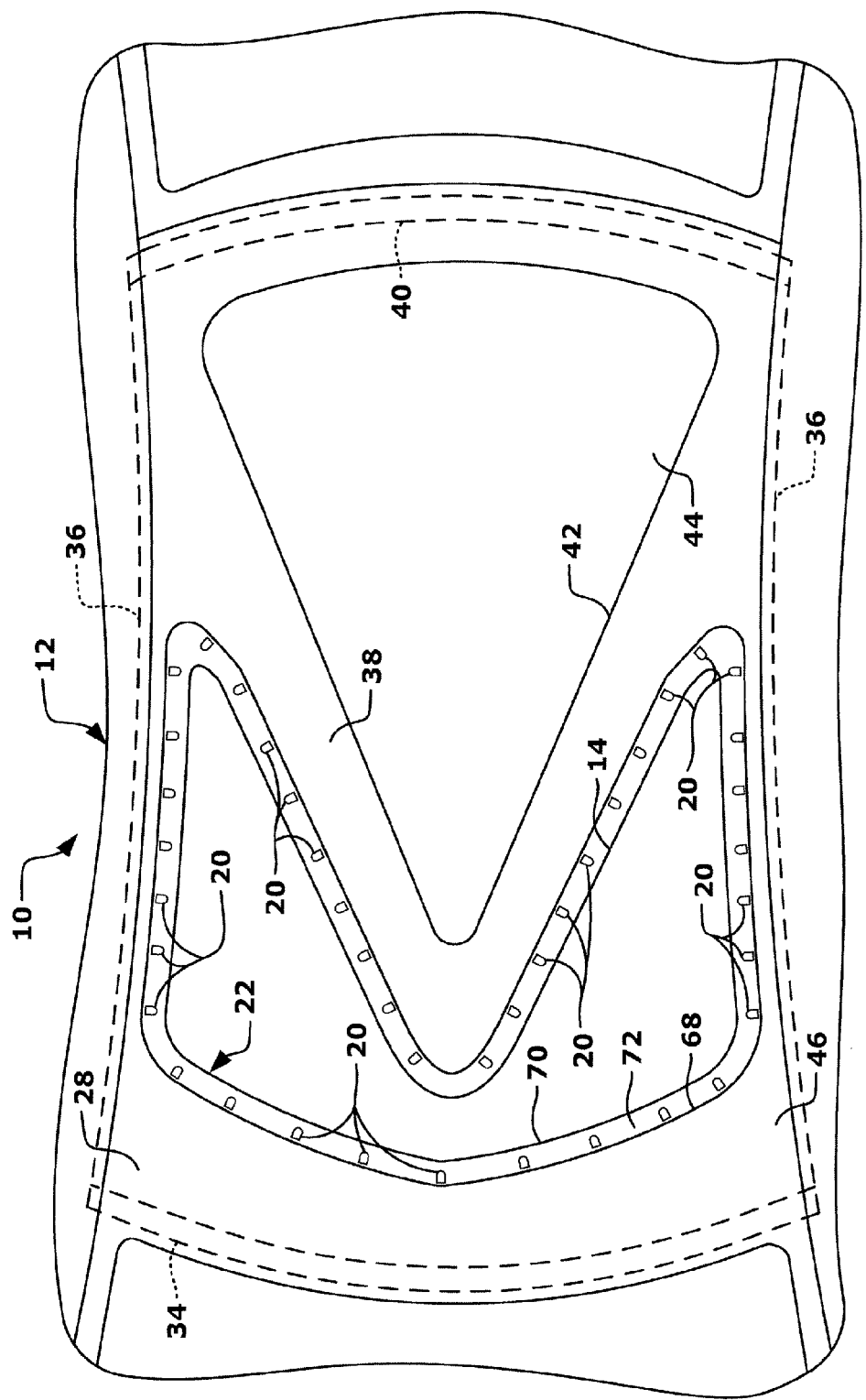
FIG. 3 is another top view of the vehicle showing the roof portion of the vehicle structure with the window panel removed revealing details of the viewing aperture and light sources of the window assembly in accordance with the first embodiment.

As indicated in FIGS. 2 and 3, the roof section 28 of the vehicle structure 12 includes a front roof rail brace 34, side roof rails 36, a roof element 38 (a roof bow), a rear roof rail brace 40, the viewing aperture 14, a rearward viewing aperture 42, the window panel 16 (removed in FIG. 3), a rear window panel 44, a roof panel 46 and a trim element 48. The window panel 16 is mounted to the roof section 28 such that the window panel 16 covers the viewing aperture 14, as indicated in FIG. 2. The rear window panel 44 is mounted to the roof section 28 such that the rear window panel 44 covers the rearward viewing aperture 42. As is described after a description of the side section 30, the trim element 48 at least partially retains the window panel 16 in position and conceals the light sources 20.

Each of the side sections 30 (only one side section is visible in FIG. 1) includes at least one door opening 50 and a corresponding door 52. The door 52 can be moved between an open orientation exposing the door opening 50 and the passenger compartment 32, and a closed orientation covering the door opening 50. The door 52 includes a first opening 54, a second opening 56, a movable window 58 and a quarter window 60. The movable window 58 is movable from a closed position covering the first opening 54 and an open position where the movable window 58 is lowered into the door 52 in a conventional manner, exposing the first opening 54. The quarter window 60 is fixed to the door 52 covering the second opening 56.

Figure 4:
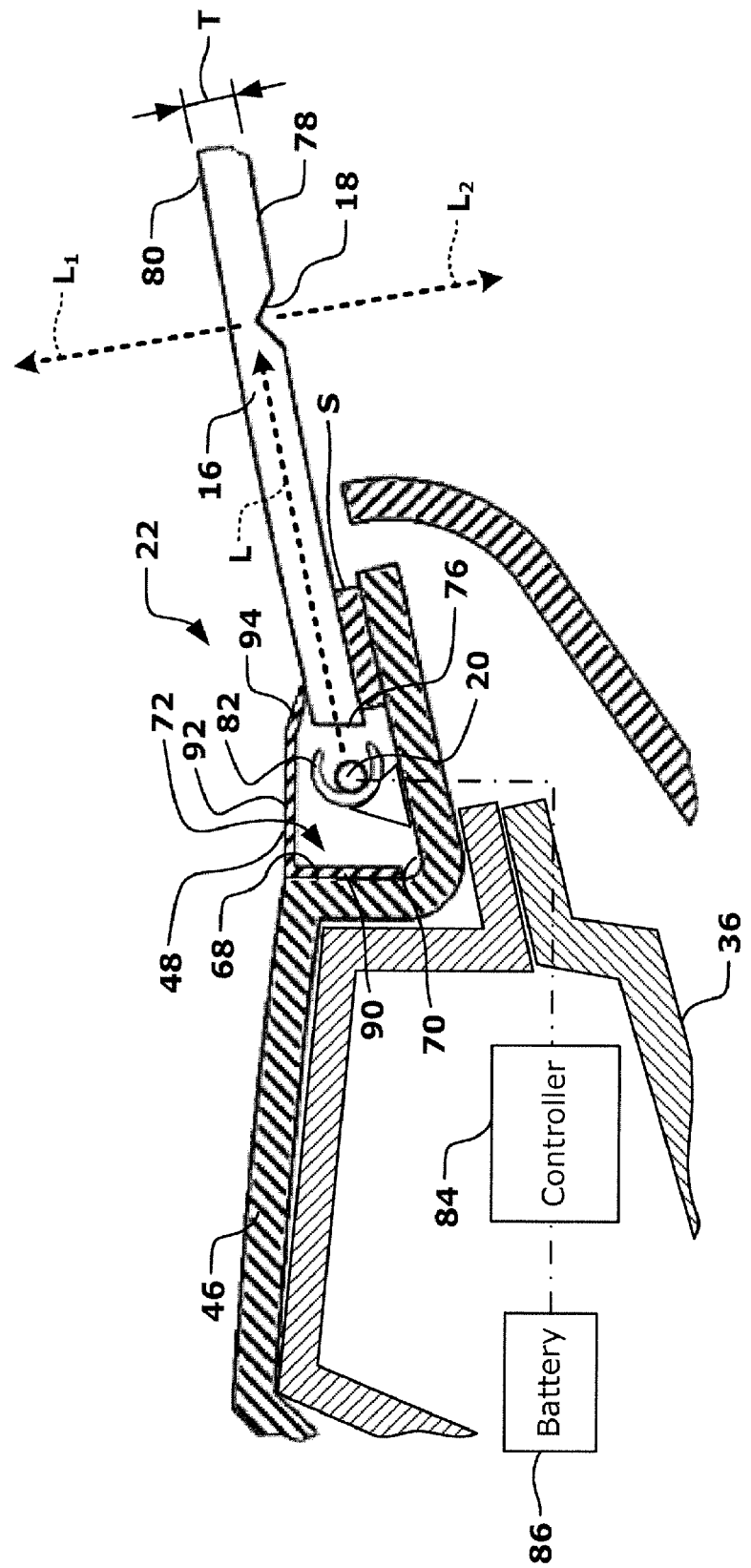
FIG. 4 is a cross-sectional view of the vehicle structure taken along the line 4-4 in FIG. 2 showing roof structure elements including a trim element that surrounds the viewing aperture, the window panel, one of the etched sections of the window panel and a light source that selectively illuminates the etched section in accordance with the first embodiment.

A detailed description of window assembly 22, including a description of structure related to the viewing aperture 14 and window panel 16 is now provided with specific reference to FIGS. 2, 3 and 4.

In the depicted embodiment, the viewing aperture 14 and the rearward viewing aperture 42 are separated by the roof element 38 that extends between side roof rails 36 (and the side sections 30) of the vehicle structure 12. It should be understood from the drawings and the description herein, that the roof section 28 can alternatively be provided with a single viewing aperture and a single window panel mounted to the vehicle structure 12 covering the single viewing aperture. The size and shape of the single viewing aperture and the single window panel can vary depending upon the size of the vehicle and the vehicle design. For example, the single viewing aperture can have a rectangular shape that extends along a majority of the roof section 28 or can be a smaller dimension providing light primarily to a front seat area of the passenger compartment 32 or a rear seat area of the passenger compartment. Alternatively, the vehicle 10 can be provided with a single viewing aperture corresponding is size and shape to the viewing aperture 14 depicted in the drawings, with the rearward viewing aperture being omitted and replaced with a solid roof panel.

The viewing aperture 14 and the window panel 16 at least partially constitute a sunroof that allows natural light to shine into the passenger compartment 32. The viewing aperture 14 and the window panel 16 are depicted having a shape similar to a concave polygon. However it should be understood from the drawings and description herein that the viewing aperture 14 and the window panel 16 are not limited to this shape and can be arranged and dimensioned with any of a variety of shapes and remain within the scope of the present invention.

As best shown in FIGS. 3 and 4, the viewing aperture 14 is defined and surrounded by the roof panel 46 of the roof section 28 of the vehicle structure 12. In other words, the viewing aperture 14 is an opening or cut out section of the roof panel 46. The roof panel 46 further includes a wall section 68 and a recessed lip 70 that extend around the viewing aperture 14 at least partially defining a recessed area 72, as best shown in cross-section in FIG. 4. The recessed area 72 encircles the window panel 16, and is confined by the recessed lip 70, the wall section 68, the trim element 48 and the window panel 16. As shown in FIG. 4, the recessed lip 70 is located vertically below the exterior roof surface defined by the roof panel 46. In the depicted embodiment, the recessed area 72 completely surrounds the entire viewing aperture 14. Further, the recessed area 72 also defines a lighting enclosure, as described in greater detail below.

The window panel 16 is made of a transparent glass material and includes a peripheral edge 76, a first window surface 78, a second window surface 80 and the etched sections 18, as indicated in FIG. 4. The peripheral edge 76 surrounds the first window surface 78 and the second window surface 80 as indicated in FIG. 2, with the second window surface 80 being located opposite the first window surface and the first window surface 78 including the etched sections 18. As indicated in FIG. 4, the first window surface 78 faces the passenger compartment 32 and the second window surface 80 at least partially defines the exterior roof surface of the vehicle 10. The second window surface 80 of the window panel 16 is basically an exterior surface of the vehicle 10 and mounted flush with the outer surface of the roof panel 46 of the vehicle structure 12.

As best shown in FIG. 2, the etched sections 18 provide an aesthetically pleasing appearance to the window panel 16. In the depicted embodiment, the etched sections 18 extend between opposite lateral sides of the window panel 16 with an open V-shape or U-shape. However, it should be understood from the drawings and the description herein that the etched section 18 can have any of a variety of shapes and appearances. The etched sections 18 are areas of the first window surface 78 that have been altered in any of a variety of ways. For example, the etched sections 18 can be mechanically shaped by, for instance, an etching tool mechanically providing the etched sections 18 with a rough surface. The etched section 18 can alternatively be chemically treated providing the etched sections 18 with a rough surface. Further, the etched sections 18 can be notches or grooves formed in the first window surface 78.

The window panel 16 is installed in the viewing aperture 14 with a seal S shown in FIG. 4. The seal S extends around the periphery of the recessed lip 70 and seals the window panel 16 in position above the passenger compartment within the viewing aperture 14. The window panel 16 is positioned such that the recessed area 72 has an overall uniform width between the peripheral edge 76 of the window panel 16 and the wall section 68.

As shown in FIGS. 3 and 4, the light sources 20 are installed within the recessed area 72. Specifically, the light sources 20 are fixed to the recessed lip 70 within the recessed area 72 between the peripheral edge 76 of the window panel 16 and the vehicle structure 12. Further, the light sources 20 are mounted to the vehicle structure 12 adjacent to a portion of the peripheral edge 76 of the window panel 16 such that light from the light sources 20 is directed to the portion of the peripheral edge 76 of the window panel 16. More specifically, the light sources 20 are aimed at the peripheral edge 76 such that the light from the light sources 20 travels in a lateral direction (relative to the window panel 16) through the window panel 16 selectively illuminating the etched sections 18. Further, as indicated in FIG. 4, the light sources 20 are aligned with a center of the window panel 16 relative to a direction of a thickness T of the window panel 16.

As best shown in FIG. 3, at least a portion of the light sources 20 are disposed adjacent to the side roof rails 36 of the vehicle structure 12.

As is indicated in FIG. 4, the light L from the light sources 20 travels laterally through the window panel 16 and illuminates the etched sections 18. The light L is reflected or scattered by the etched section 18 causing the light L to be visible as scattered light $L_1$ and $L_2$. Since the remainder of the window panel 16 is transparent, the light L from the light sources 20 does not necessarily illuminate the remainder of the window panel 16. Hence, primarily, only the etched section 18 are illuminated to a degree easily noticeable by passengers within the passenger compartment 32 and by people within a line of sight of an exterior of the roof section 28 of the vehicle 10.

As best shown in FIG. 3, the light sources 20 (a plurality of light providing devices) are spaced apart from one another around the peripheral edge 76 of the window panel 16 within the recessed area 72. Consequently, the recessed area 72 is a lighting enclosure confined between the window panel 16, the trim element 48 and the vehicle structure 12 with the light source being concealed therebetween.

The light sources 20 of the window assembly 22 include, for example, a plurality of LEDs (light emitting diodes). The number and spacing between each of the light sources 20 can vary. For example, if the LEDs used as the light sources 20 have a low level of luminance, more of the light sources 20 may be required. Similarly, if the LEDs used as the light sources 20 have a high level of luminance, then fewer LEDs are required and may be spaced further apart from one another. Further, the LEDs can have differing colors or can have all the same color light output.

The light sources 20 can also be provided with a reflector 82, as shown in FIG. 4. The reflector 82 is an optional feature that is included depending upon to focal output of the light sources 20. For example, in an alternative configuration, the light sources 20 can be incandescent light bulbs. In such a configuration, the reflectors 82 are advantageous for focusing the emitted light toward the peripheral edge 76 of the window panel 16. The reflector 82 can also be advantageous with some types of LEDs.

As shown schematically in FIG. 4, a controller 84 is electronically connected to the light sources 20 and to a vehicle battery 86. The controller 84 can be located in any of a variety of locations within the vehicle 10 and need not be located under or near the roof panel 46. The controller 84 is configured to selectively provide electric power to the light sources 20. More specifically, the controller 84 is configured to selectively provide electric power to groups of the light sources 20, such that all of the light sources 20 can be illuminated and sub-sets of the light sources 20 can be shut off. In other words, by controlling the number of light sources 20 that are illuminated, the brightness and/or color of the etched section 18 can be controlled. Although not shown in the first embodiment, the controller 84 is connected to a switch (not shown) within the passenger compartment 32 for controlling the level of illumination of the etched sections 18 of the window panel 16.

As shown in FIGS. 2 and 4, the trim element 48 is an elongated single piece or single element that is dimensioned to fit into the recessed area 72 and contact the wall section 68 of the roof panel 46. The trim element 48 can be a continuous uninterrupted loop or can be a linear element joined to make a loop. The trim element 48 can include a metallic backing material, a polymer sealing material, a composite material, and/or combinations of these materials. The trim element 48 is fixed in place against the wall section 68 by fasteners (not shown) and/or snap-fitting connectors (not shown). Consequently, the trim element 48 is installed along a periphery of the viewing aperture 14 coupling the window panel 16 to the vehicle structure 12.

The trim element 48 includes a vertical section 90, a horizontal section 92 and a sealing section 94, as shown in FIG. 4. The vertical section 90 fits against the wall section 68 to fix the trim element 48 in position within the recessed area 72. The horizontal section 92 extends inward toward the viewing aperture 14 covering the recessed area 72 and concealing the light sources 20. The sealing section 94 is angled downward and presses against the window panel 16, at least partially restraining the window panel 16 against lateral movement with respect to the viewing aperture 14.

As described above, the window assembly 22 includes concealed light sources 20 that provide light to the peripheral edge 76 of the window panel 16 in order to illuminate the etched sections 18 of the window panel 16. Since the etched section 18 extend along central sections of the window panel 16, when the light sources 20 emit light, the etched section 18 become illuminated with little or no evidence of the source of light, providing a visually pleasing appearance.

Second Embodiment

Figure 5:
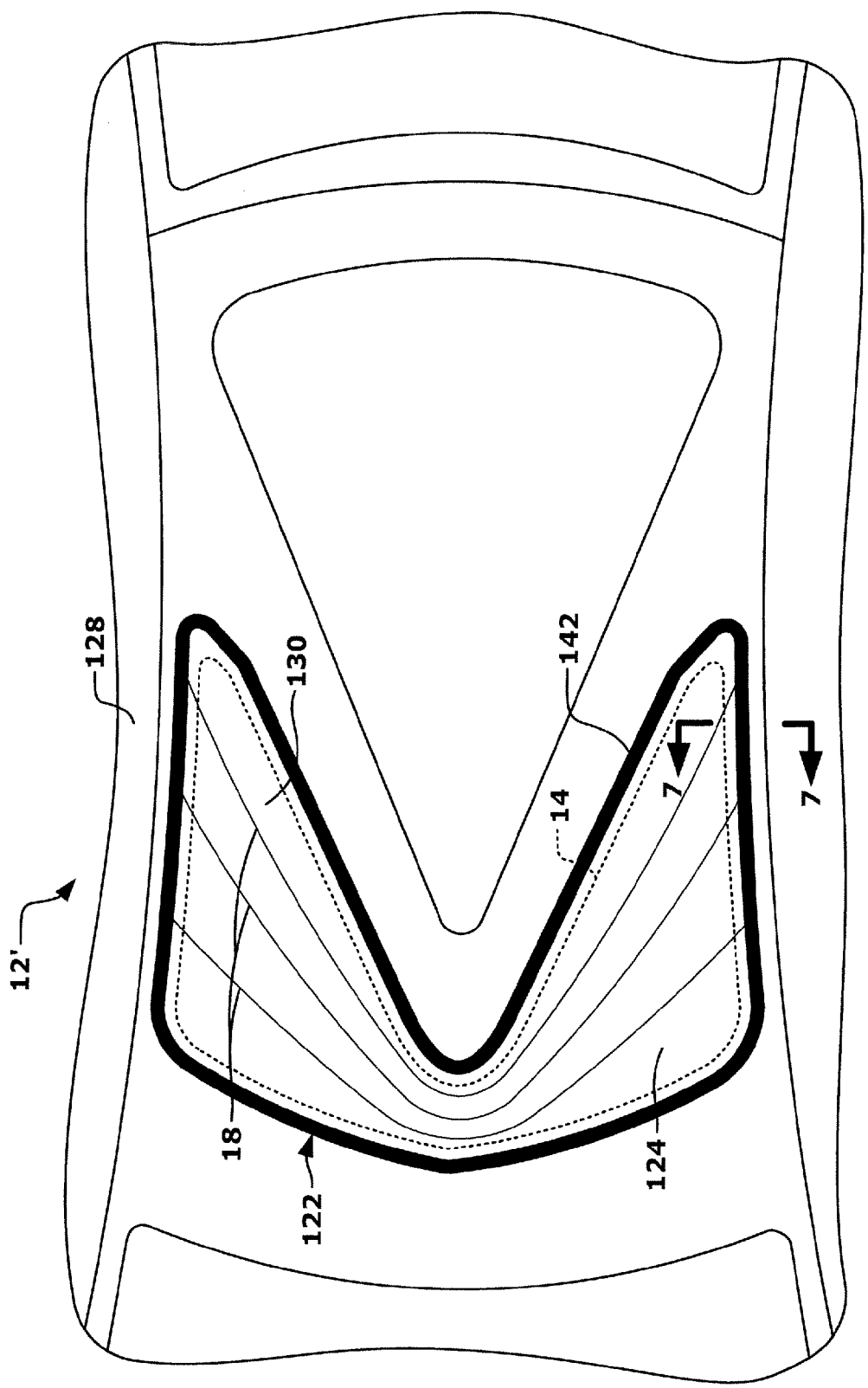
FIG. 5 is a top view of a vehicle showing a roof portion of a vehicle structure that includes a window assembly with a viewing aperture and a window panel defining a sunroof, the window panel having etched sections in accordance with a second embodiment.
Figure 6:
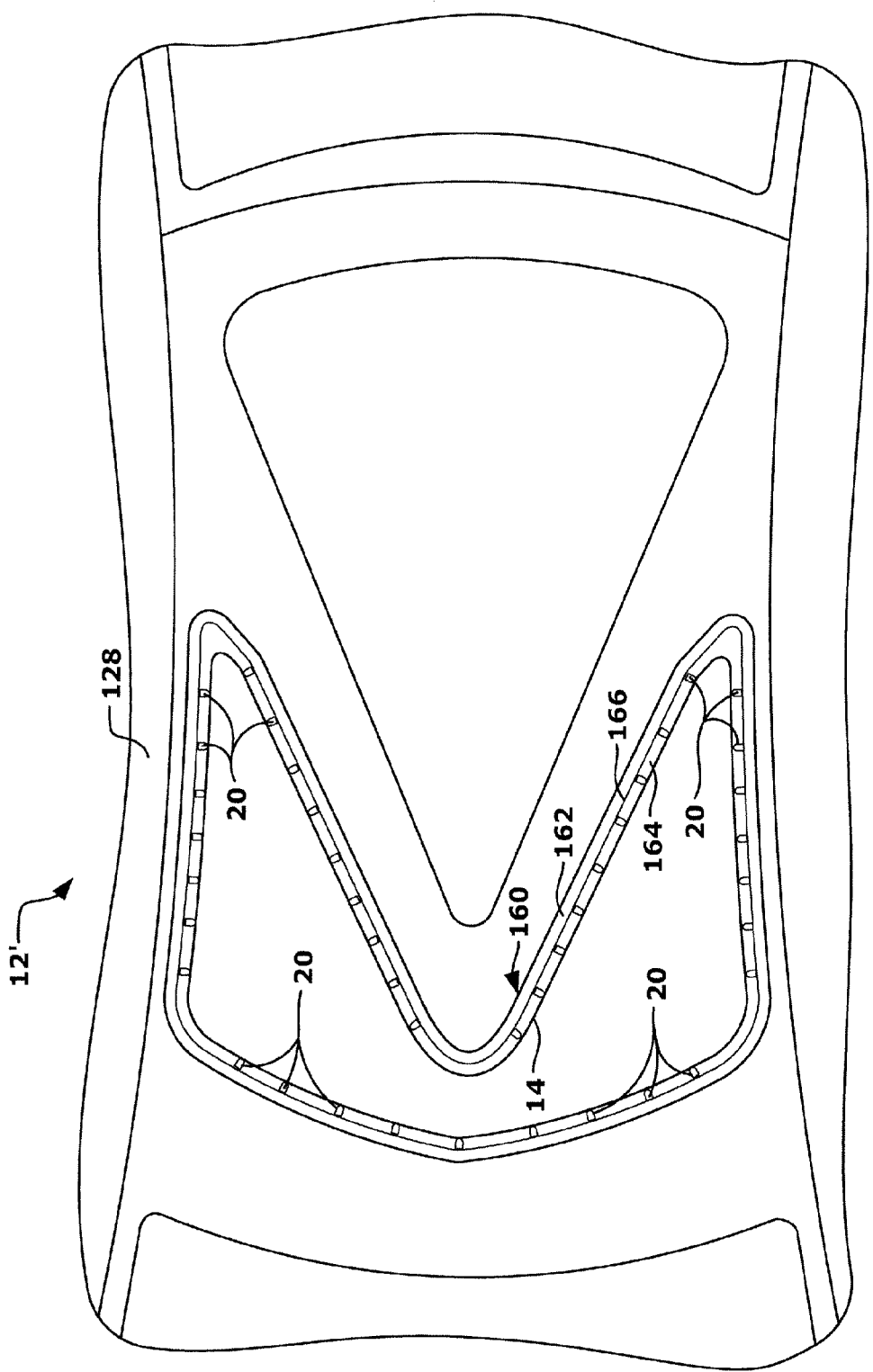
FIG. 6 is a top view of the vehicle showing the roof portion of the vehicle structure with the window panel removed revealing details of the window assembly including the viewing aperture and light sources in accordance with the second embodiment.
Figure 7:
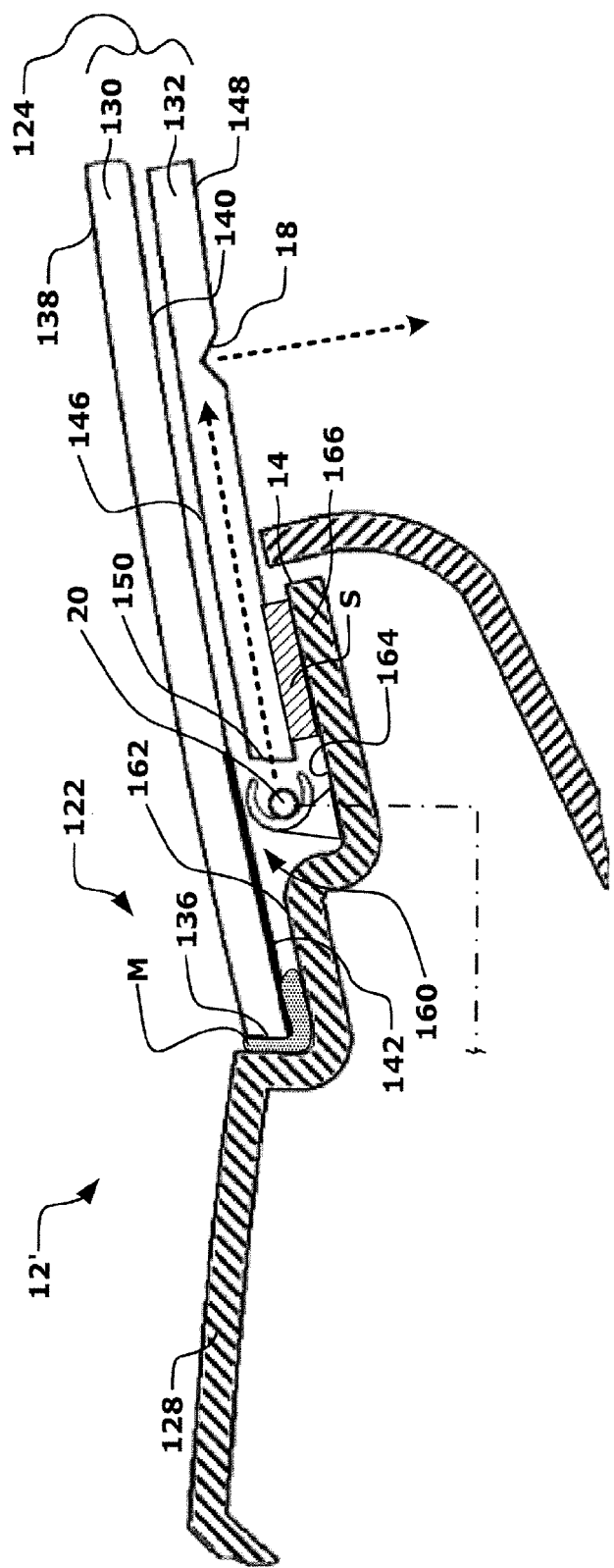
FIG. 7 is a cross-sectional view of the vehicle structure taken along the line 7-7 in FIG. 4 showing roof structure elements including a viewing aperture, a window panel, an etched section of the window panel and a light source that selectively illuminates the etched section of the window assembly in accordance with the second embodiment.

Referring now to FIGS. 5, 6 and 7, a vehicle structure 12' and a window assembly 122 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The window assembly 122 includes a window panel 124, a roof section 128 and the light sources 20 (FIGS. 6 and 7). The window assembly 122 is modified as compared with the window assembly 22 of the first embodiment having additional features and having features omitted. Specifically, the trim element 48 has been omitted in the second embodiment. The window panel 124 replaces the window panel 16 of the first embodiment and the roof section 128 has been modified in the area surrounding the viewing aperture 14 when compared to the roof section 28 of the first embodiment, as described below.

As best shown in FIG. 7, the window panel 124 includes an outer panel 130 and an inner panel 132. The outer panel 130 includes an outer peripheral edge 136, an outer surface 138 and an inner surface 140. The inner surface 140 also includes a masking material 142 that covers a portion of the inner surface 140 adjacent to the outer peripheral edge 136. The masking material 130 prevents light from passing therethrough. As is best shown in FIG. 7, the masking material 142 extends inward from a peripheral edge of the outer panel 130 a uniform distance along the outer peripheral edge 136 sufficient to conceal the light sources 20.

The inner panel 132 has smaller width and length dimensions than the outer panel 130 such that the outer panel 130 completely covers the inner panel 132. Further, the outer peripheral edge 136 of the outer panel 130 extends laterally beyond the peripheral edge 150 of the inner panel 132 such that the outer panel 130 and the vehicle structure 12' at least partially define a lighting enclosure with the light sources 20 being concealed therebetween, as described further below.

The inner panel 132 and the outer panel 130 can be separate panels spaced apart from one another, as shown in FIG. 7, or can be joined together as a single unitary element. The inner panel 132 includes an outer surface 146, an inner surface 148, an outer peripheral edge 150 and the etched sections 18. More specifically, the etched sections 18 are located on the inner surface 148 of the inner panel 132.

As best shown in FIGS. 6 and 7, the roof section 128 includes the viewing aperture 14 and a recessed area 160. The recessed area 140 includes a first stepped portion 162 and a second stepped portion 164. Both the first and second stepped portions 162 and 164 are located below an upper or outer surface of the roof section 128. The first stepped portion 162 of the recessed area 160 surrounds the second stepped portion 164, as indicated in FIGS. 6 and 7. Both the first and second stepped portions 162 and 164 surround the viewing aperture 14.

The outer panel 130 is installed to the first stepped portion 162 of the recessed area 160. A mastic material M or sealing material fixes the outer panel 130 to the first stepped portion 162 such that the outer surface 138 of the outer panel 130 is approximately even with or mates with the outer surface of the roof section 128, as indicated in FIG. 7. The inner panel 132 is installed with a mastic material, seal material or the seal S between a recessed lip 166 of the second stepped portion 164.

The light sources 20 are installed within the recessed area 160 and are mounted to the second stepped portion 164, as shown in FIG. 7. The light sources 20 are arranged relative to the peripheral edge 150 of the inner panel 132 such that the light from the light sources 20 are directed to the peripheral edge 150 of the inner panel 132. The masking material 142 conceals the light sources 20. Further, the recessed area 160 defines a lighting enclosure that confines the light sources 20, protecting them from the elements. The light enclosure (the recessed area 160) is confined by the area of the outer panel 130 having the masking material 142, the first stepped portion 162, the second stepped portion 164 and the peripheral edge 150 of the inner panel 132.

Third Embodiment

Figure 8:
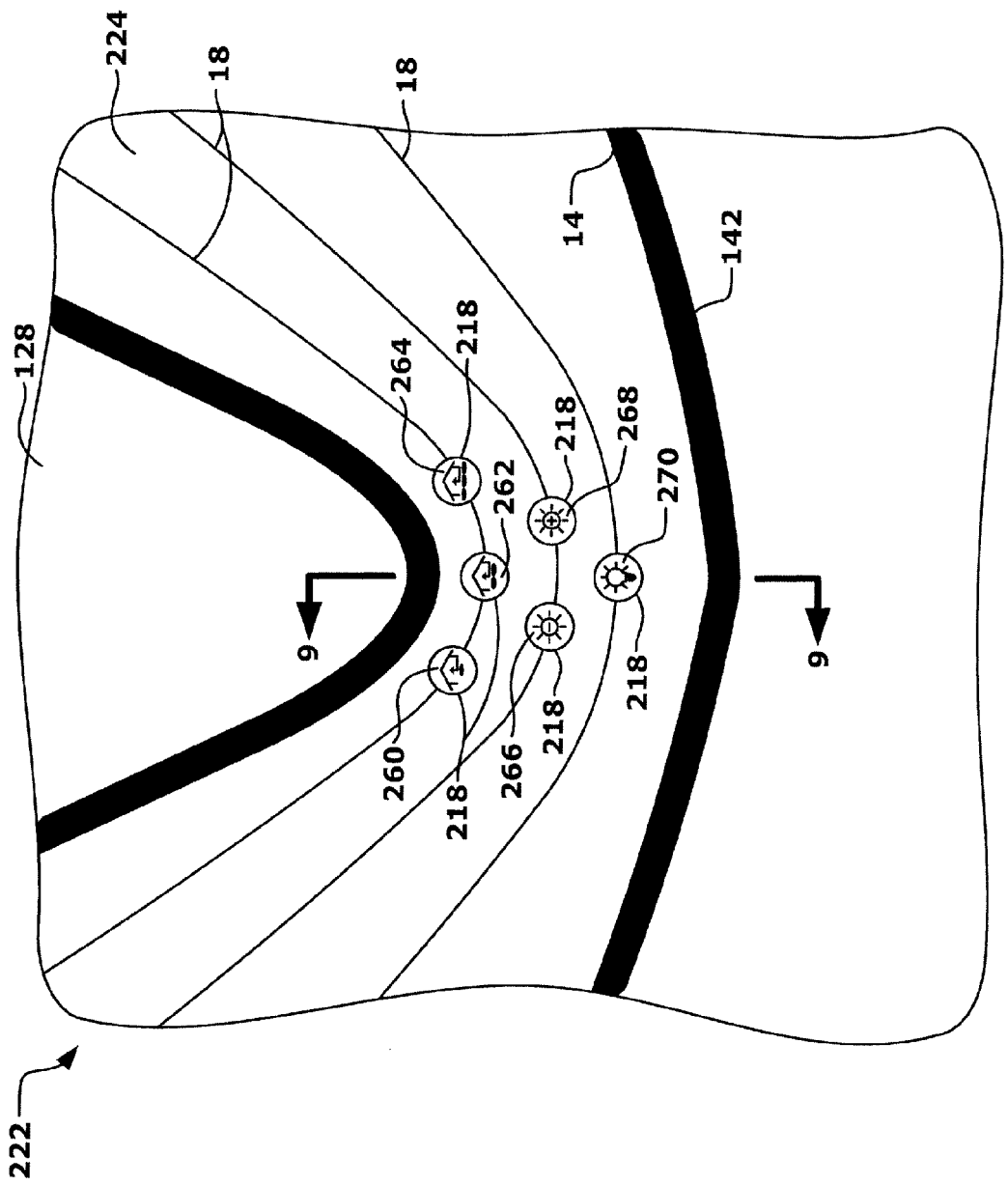
FIG. 8 is a bottom view of a roof portion of a vehicle structure showing an interior surface of a window panel of a lighting and switch arrangement, the window panel including etched sections and a plurality of switches in accordance with a third embodiment.
Figure 9:
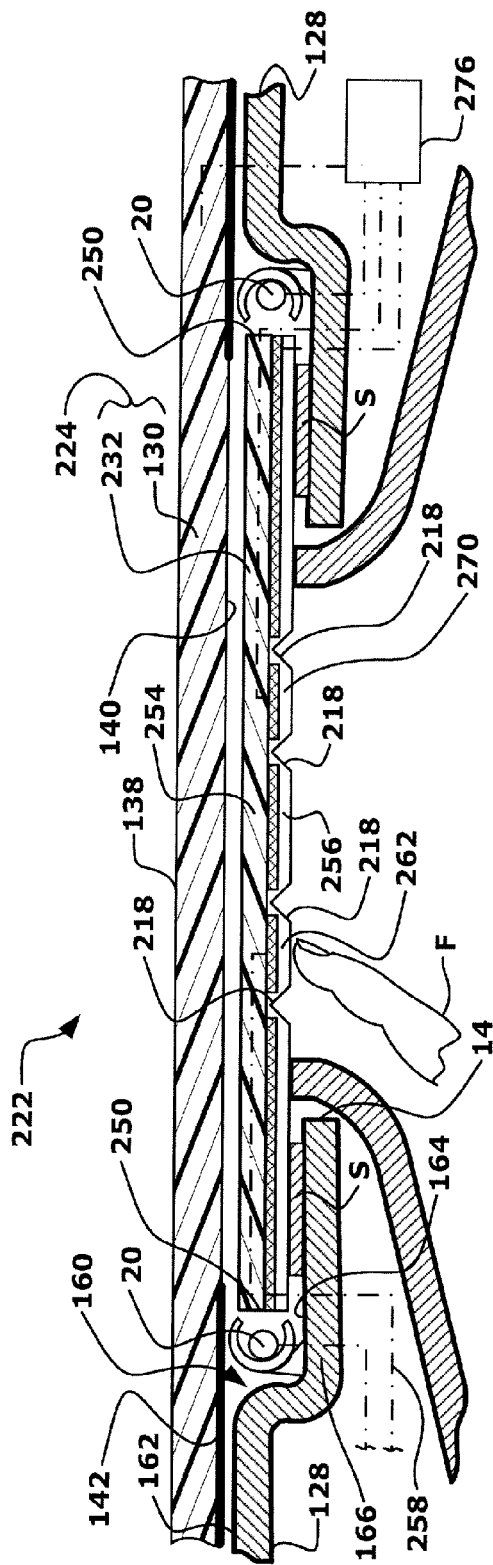
FIG. 9 is a cross-sectional view of the window panel and two of the switches taken along the line 9-9 in FIG. 8 in accordance with the third embodiment.
Figure 10:
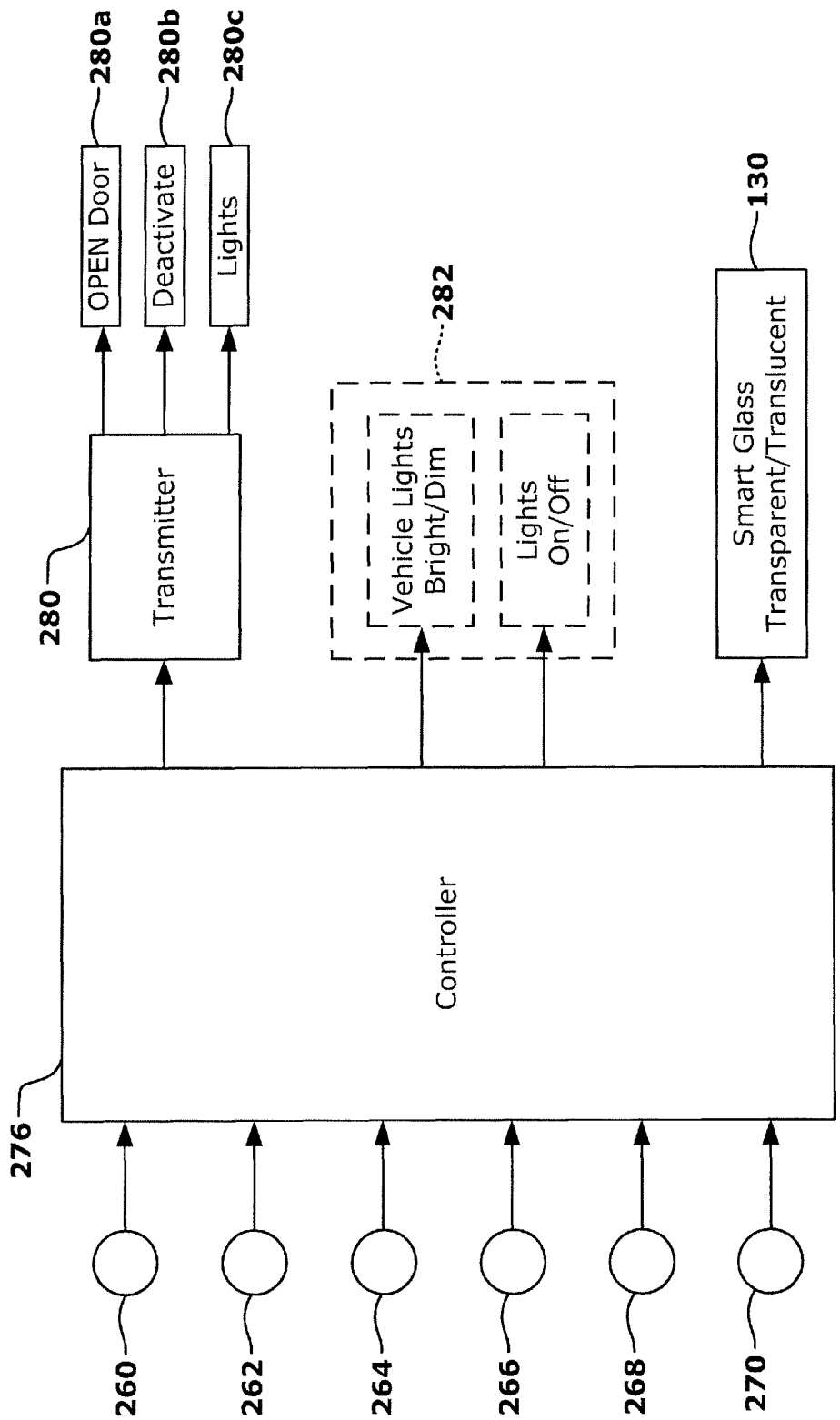
FIG. 10 is a schematic representation of the switches, a controller and devices the switches control in accordance with the third embodiment.

Referring now to FIGS. 8-10, a window assembly 222 in accordance with a third embodiment will now be explained. In view of the similarity between the first, second and third embodiments, the parts of the third embodiment that are identical to the parts of the first embodiment and/or the second embodiment will be given the same reference numerals as the parts of the first and second embodiments. Moreover, the descriptions of the parts of the third embodiment that are identical to the parts of the first embodiment may be omitted for the sake of brevity.

The window assembly 222 includes a window panel 224, the roof section 128 and the light sources 20 (FIG. 9). The window assembly 222 is modified as compared with the window assembly 22 of the first embodiment having additional features and having features omitted. Specifically, the trim element 48 has been omitted in the third embodiment. The window panel 224 replaces the window panel 16 of the first embodiment and the roof section 128 has been modified in the area surrounding the viewing aperture 14 when compared to the roof section 28 of the first embodiment, as described below. More specifically, the roof section 128 is the same as described above with respect to the second embodiment and includes the recessed area 160, the first stepped portion 162, the second stepped portion 164 and the recessed lip 166.

The window panel 224 includes the outer panel 130 (same as described above in the second embodiment) and an inner panel 232. As with the first and second embodiments, the window panel 224 is substantially transparent and is non-movably fixed to the roof section 128. The outer panel 130 is a rigid glass element that includes the outer surface 138 and the inner surface 140. The inner surface 140 further includes the masking material 142, as described above with respect to the second embodiment. The inner panel 232 has approximately the same dimensions as the inner panel 132 of the second embodiment. Specifically, the inner panel 232 has smaller width and length dimensions than the outer panel 130 such that the outer panel 130 completely covers the inner panel 232. Further, the outer peripheral edge 136 of the outer panel 130 extends laterally beyond a peripheral edge 250 of the inner panel 232 such that the outer panel 130 and the vehicle structure at least partially define the lighting enclosure (the recessed area 160) with the light sources 20 being concealed therebetween. The light sources 20 are positioned to provide light to the peripheral edge 250 of the inner panel 232.

The outer panel 130 can be a conventional piece of automotive glass, plexi glass or safety glass. However, the outer panel 130 can alternatively be an electrochromic panel that changes its opacity in response to electricity flowing therethrough. Such electrochromic panels are also referred to as smart glass. Smart glass is a glass material or a material embedded within glass that is transparent when in a deactivated state. However, when smart glass is subjected to an electric current (an activated state), smart glass changes opacity becoming translucent, frosted or tinted. Since smart glass is conventional, further description is omitted for the sake of brevity. In an embodiment where the outer panel 130 is made of smart glass, the smart glass is activated (opacity changed) in a manner described in greater detail below.

The window panel 224 can be a single unitary window with the outer panel 130 being fixed to the inner panel 232. However, in the depicted embodiment, the outer panel 130 and the inner panel 232 of the window panel 224 are separate elements that are spaced apart from one another.

As indicated in FIGS. 8 and 9, the inner panel 232 includes the peripheral edge 250, a rigid glass layer 254, a switch layer 256 and a plurality of electric wires 258 extending through one or both of the glass layer 254 and the switch layer 256. The switch layer 256 further includes the etched sections 18 (shown in FIG. 8) and etched sections 218 that encircle each of a plurality of proximity switches 260, 262, 264, 268, 270 and 272 connected to the wires 258. As indicated in FIG. 8, the etched sections 218 intersect with the etched sections 18. In FIG. 9, only the etched sections 218 are visible.

As indicated schematically in FIG. 9, the proximity switches 260, 262, 264, 268, 270 and 272 are connected to a controller 276 via the wires 258. The switch layer 256 can be a rigid layer of material with the switches embedded therein, or the switch layer 256 can be a flexible layer with the switches embedded therein. Alternatively, the proximity switches 260, 262, 264, 268, 270 and 272 can be embedded within the outer panel 130 with the inner panel 232 being eliminated.

The proximity switches 260-272 are operated when a finger F of an operators hand comes close to or contacts one of the proximity switches 260-272. The proximity switches can function in a variety of manners. For example, the proximity switches 260-272 can generate a magnetic field. The finger F disturbs the magnetic field triggering operation of the switch. Alternatively, the proximity switches 260-272 can operate on detection of changes in resistance or changes in capacitance in the vicinity of the switch using a dielectric material to sense such changes. Such switch configurations and operations are well known, in for example U.S. Pat. No. 7,445,350 issued Nov. 4, 2008 and U.S. Pat. No. 7,663,607 issued Feb. 16, 2010. Both U.S. Pat. Nos. 7,445,350 and 7,663,607 are incorporated herein by reference in their entirety. Still further, the proximity switches 260-272 can be mechanical switches that respond to slight compression. However, in the embodiment where the proximity switches 260-272 are mechanical switches, the switch layer 256 is made of a flexible material or flexible membrane able to flex in response to compression by contact with the finger F.

The proximity switches 260-272 are embedded within the switch layer 256 such that the proximity switches 260-272 overlay respective portions of the inner surface 140 of the window panel 224. The proximity switches 260-272 are substantially transparent so that the operator of the vehicle can see through the switches. However, the proximity switches 260-272 include indicia that are only partially transparent or translucent. As shown in FIG. 8, the indicia associated with a particular switch indicates the vehicle feature operated by that switch. In the embodiment depicted in FIGS. 8 and 9, the indicia is printed or otherwise provided on the proximity switches 262-270. As is described further below in the fifth through eighth embodiments, the indicia can be provided in various other locations, in registry and/or aligned with the respective ones of the proximity switches 262-270.

FIG. 10 is a schematic representation of the proximity switches 262-270 and the features of the vehicle controlled by the proximity switches 262-270. For example, the proximity switches 262-270 are connected to the controller 276. The controller 276 is connected to, for example, a transmitter 280, passenger compartment lights 282 and, optionally, the outer panel 130 of the window panel 224.

The proximity switches 262-270 can be programmed via the controller 276, to control any of a variety of functions. For example, the switches 260, 262 and 264 can be programmable in a conventional manner via the controller 276 to control features of the vehicle owner's home. Specifically, the switches 260, 262 and 264 can cause operation of the transmitter 280 to transmit a command 280a that causes one or more garage doors to open and/or close. Additionally, one of the switches 260, 262 and 264 can cause the transmitter 280 to transmit a command 280b that causes a home security system to be armed or disarmed. Further one of the switches 260, 262 and 264 can cause the transmitter 280 to transmit a command 280c that causes household lights to be turned on and/or off.

The switches 266 and 268 can be programmed to operate passenger compartment lights and/or the light sources 20. Specifically, one of the switches 266 and 268 can be programmed via the controller 276 to brighten or dim dashboard lights (not shown), passenger compartment overhead lights (not shown) and/or the light sources 20. Similarly, the other of the switches 266 and 268 can be programmed via the controller 276 to toggle one or all of the dashboard lights, the passenger compartment overhead lights and/or the light sources 20 on and off.

Further, the light switch 270 can be programmed to control the opacity of the outer panel 130, when the outer panel 130 includes smart glass.

It should be understood from the drawings and the description herein that the switches 262-270 can be programmed to operate any device or feature installed within the vehicle. The operation of the switches 262-270 is programmable in a conventional manner via, for example, controls (not shown) in the dashboard (not shown) of the vehicle 10 and connected to the controller 276. Since such controls and programming features are conventional in nature, further description is omitted for brevity.

Fourth Embodiment

Figure 11:
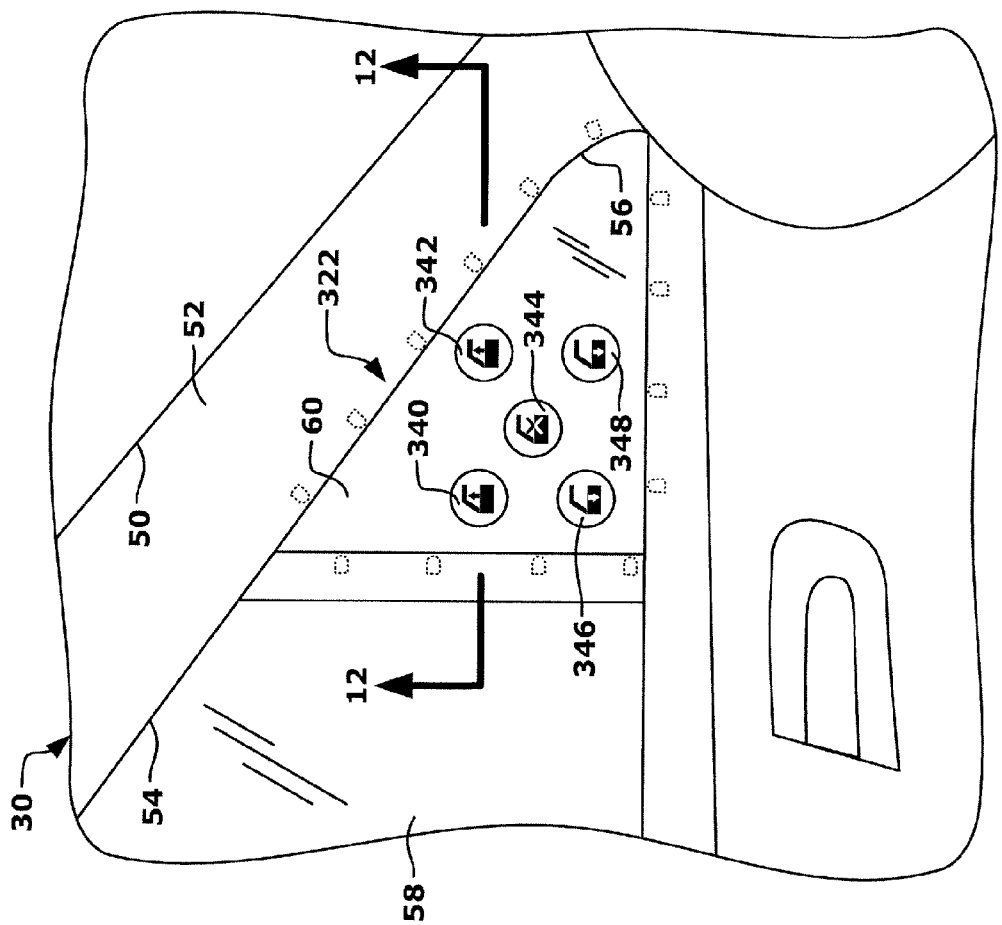
FIG. 11 is an interior view of a door of a vehicle structure showing a window panel that includes a plurality of switches in accordance with a fourth embodiment.
Figure 12:
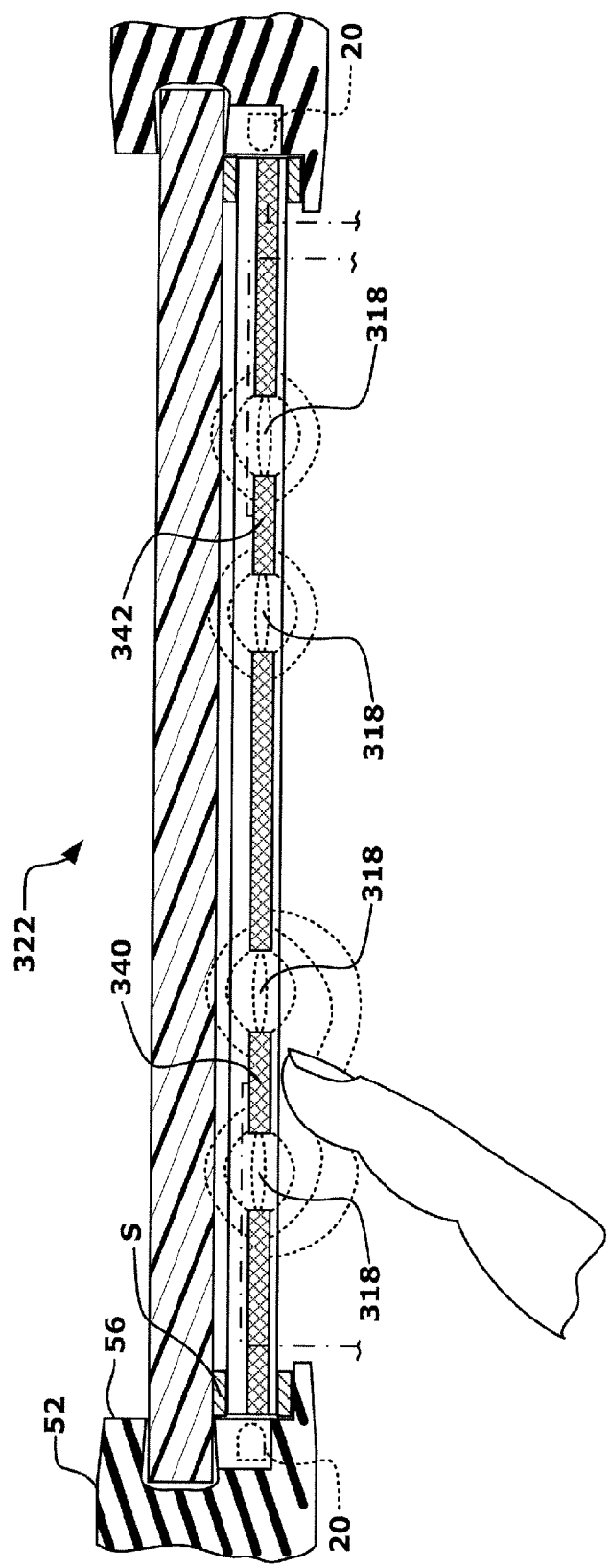
FIG. 12 is a cross-sectional view of the window panel and two of the switches taken along the line 12-12 in FIG. 11 in accordance with the fourth embodiment.

Referring now to FIGS. 11-12, a window assembly 322 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

In the fourth embodiment, the window assembly 322 is located in the door 52 of the side section 30 of the vehicle 10. The window assembly 322 includes portions of the door 52, the second opening 56 of the door 52 and the quarter window 60.

The door 52 includes the first opening 54, the second opening 56, the movable window 58 and the quarter window 60. The movable window 58 is dimensioned to move up and down closing and opening the first opening 54 in a conventional manner. The quarter window 60 is non-movably mounted within the second opening 56 of door 52. The first opening 54 and the second opening 56 constitute viewing apertures.

The second opening 56 of the door 52 includes a recessed area 324 dimensioned to receive and fixedly secure a portion of the quarter window 60. The recessed areas 324 are also dimensioned to retain the light sources 20, as indicated in FIG. 12. As depicted in FIG. 11, the light sources 20 are positioned at spaced apart locations around the quarter window 60.

The quarter window 60 includes an outer panel 330 and an inner panel 332. The outer panel 330 is a conventional vehicle window glass. The outer panel 330 is retained within the recessed area 324 extending past the light sources 20. The inner panel 332 can be a separate panel from the outer panel 330 or alternatively can be a switching layer laminated to the outer panel 330. In the depicted embodiment, the inner panel 332 and the outer panel 330 are laminated together as a single unitary element. The inner panel 332 includes switches 340, 342, 344, 346 and 348 that are connected to, for example, a controller such as the controller 276 depicted in FIG. 10 and described above with respect to the third embodiment. The switches 340-348 can include etched sections 318 that encircle and highlight the location of the switches 340-348. In this embodiment, the etched sections 318 are located within the inner panel 332 capturing light from the light sources 20, such that the switches 340-348 or the areas around the switches 340-348 are illuminated.

The switches 340-348 can be programmed to control the movement of the movable window 60 (driver's side), the movement of another movable window (not shown) and/or the operation of electric door locks (not shown) provided in the door 52.

Fifth Embodiment

Figure 13:
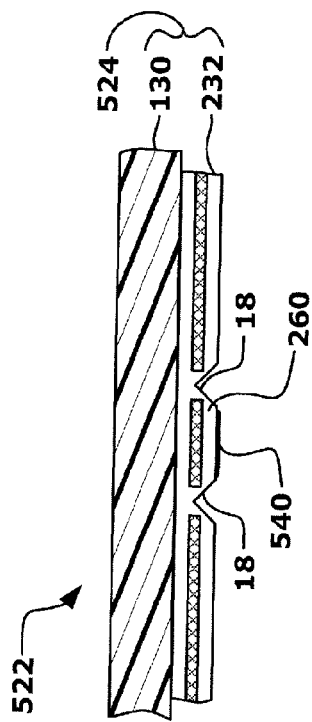
FIG. 13 is a cross-sectional view of a window panel and a switch layer showing a switch within the switch layer, the switch layer including a decal with indicia overlaying the switch in accordance with a fifth embodiment.

Referring now to FIG. 13, a window assembly 422 in accordance with a fifth embodiment will now be explained. In view of the similarity between the first, third and fifth embodiments, the parts of the fifth embodiment that are identical to the parts of the first and/or the third embodiment will be given the same reference numerals as the parts of the first and/or third embodiment. Moreover, the descriptions of the parts of the fifth embodiment that are identical to the parts of the first and/or third embodiment may be omitted for the sake of brevity.

As described above with respect to the third embodiment, each of the switches includes indicia identifying or labeling each respective switch. The indicia can be provided in any of a variety of configurations, as described below.

For example, a window panel 424 of the window assembly 422 includes the outer panel 130 (from the third embodiment), the inner panel 232 (from the third embodiment) and a decal 440 that includes indicia indicating the location and function of the switch 260. The decal 440 is adhered to an inner surface of the inner panel 232 overlaying the switch 260, thus being in alignment or registration with the switch 260, as indicated in FIG. 13.

Sixth Embodiment

Figure 14:
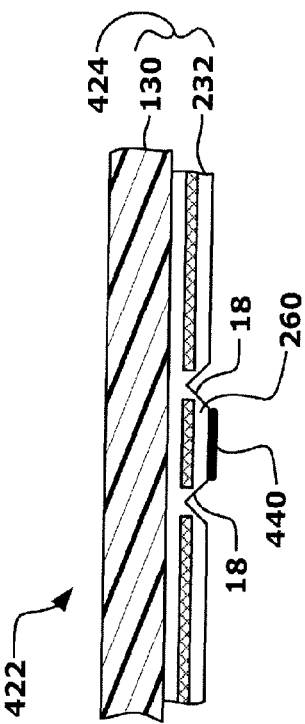
FIG. 14 is a cross-sectional view of a window panel and a switch layer showing indicia printed to the switch layer overlaying a switch within the switch layer in accordance with a sixth embodiment.

Referring now to FIG. 14, a window assembly 522 in accordance with a sixth embodiment will now be explained. In view of the similarity between the first, third and sixth embodiments, the parts of the sixth embodiment that are identical to the parts of the first and/or the third embodiment will be given the same reference numerals as the parts of the first and/or third embodiment. Moreover, the descriptions of the parts of the sixth embodiment that are identical to the parts of the first and/or third embodiment may be omitted for the sake of brevity.

In the sixth embodiment, a window panel 524 of the window assembly 522 includes the outer panel 130 (from the third embodiment), the inner panel 232 (from the third embodiment) and printed indicia 540. The print 540 includes indicia indicating the location and function of the switch 260. The print 540 is printed on an inner surface of the inner panel 232, as indicated in FIG. 14.

Seventh Embodiment

Figure 15:
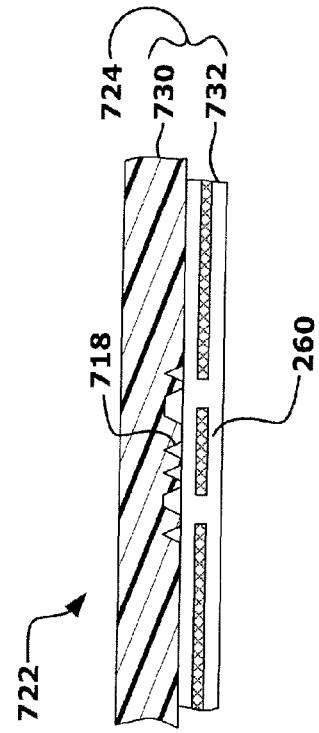
FIG. 15 is a cross-sectional view of a window panel and a switch layer showing indicia etched into the switch layer overlaying the switch in accordance with a seventh embodiment.

Referring now to FIG. 15, a window assembly 622 in accordance with a seventh embodiment will now be explained. In view of the similarity between the first, third and seventh embodiments, the parts of the seventh embodiment that are identical to the parts of the first and/or the third embodiment will be given the same reference numerals as the parts of the first and/or third embodiment. Moreover, the descriptions of the parts of the seventh embodiment that are identical to the parts of the first and/or third embodiment may be omitted for the sake of brevity.

In the seventh embodiment, a window panel 624 of the window assembly 622 includes the outer panel 130 (from the third embodiment) and an inner panel 632.

The inner panel 632 is identical to the inner panel 232 except that the inner panel 632 does not have the etched sections 18. Instead, the inner panel 632 includes an etched section 618 that includes indicia indicating the location and function of the switch 260. The etched section 618 is formed on an inner surface of the inner panel 632, as indicated in FIG. 15.

Eighth Embodiment

Figure 16:
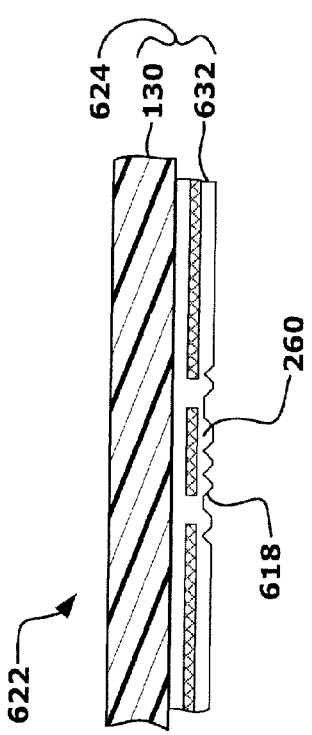
FIG. 16 is a cross-sectional view of a window panel and a switch layer showing indicia etched into the window panel with a switch within the switch layer overlaying the indicia in accordance with an eighth embodiment.

Referring now to FIG. 16, a window assembly 722 in accordance with an eighth embodiment will now be explained. In view of the similarity between the first, third and eighth embodiments, the parts of the eighth embodiment that are identical to the parts of the first and/or the third embodiment will be given the same reference numerals as the parts of the first and/or third embodiment. Moreover, the descriptions of the parts of the eighth embodiment that are identical to the parts of the first and/or third embodiment may be omitted for the sake of brevity.

In the eighth embodiment, a window panel 724 of the window assembly 722 includes an outer panel 730 and an inner panel 732.

The outer panel 730 has the same features and dimensions as the outer panel 130, except that the outer panel 730 includes an etched section 718.

The inner panel 732 is identical to the inner panel 232 except that the inner panel 732 does not have the etched sections 218.

The etched section 718 is formed on an inner surface of the outer panel 730, as indicated in FIG. 16. Hence, the proximity switch 260 overlays the etched section 718. The etched section 718 includes indicia indicating the location and function of the switch 260.

Ninth Embodiment

Figure 19:
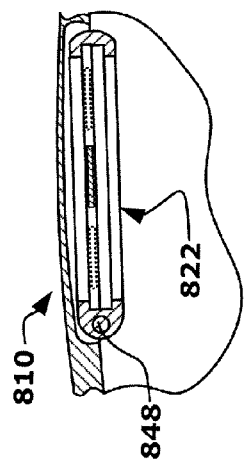
FIG. 19 is another cross-sectional view of the window panel taken along the line 18-18 in FIG. 17, showing the glass panel and switches in a retracted position in accordance with the ninth embodiment.
Figure 18:
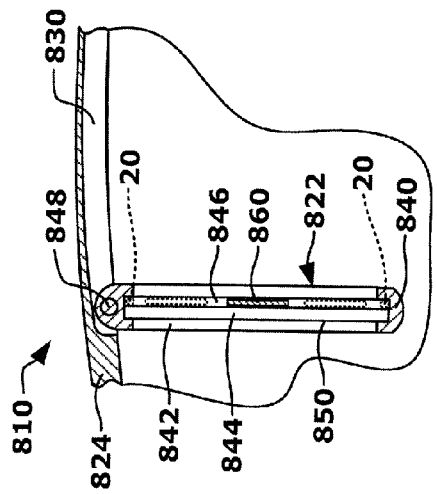
FIG. 18 is a cross-sectional view of the window panel taken along the line 18-18 in FIG. 17, showing the glass panel and switches in an extended position in accordance with the ninth embodiment.
Figure 17:
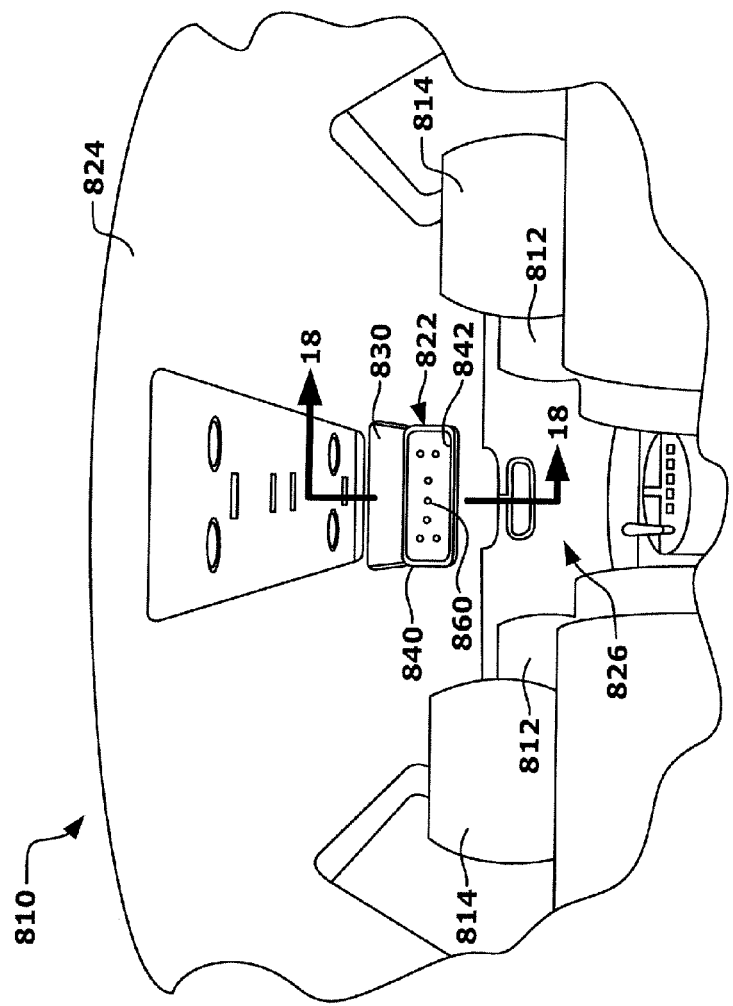
FIG. 17 is a perspective interior view of a vehicle showing a window panel within the vehicle that includes a plurality of switches in accordance with a ninth embodiment.

Referring now to FIGS. 17, 18 and 19, a vehicle 810 that includes a window assembly 822 in accordance with a ninth embodiment will now be explained. In view of the similarity between the first and ninth embodiments, the parts of the ninth embodiment that are identical to the parts of the first embodiment will be given the same reference numerals as the parts of the first embodiment. Moreover, the descriptions of the parts of the ninth embodiment that are identical to the parts of the first embodiment may be omitted for the sake of brevity.

The vehicle 810 includes front seats 812, rear seats 814, a trim component 824 and the window assembly 822. The front seats 812, the rear seats 814 and the trim component 824 are all located within a passenger compartment 826 of the vehicle 810. The trim component 824 is part of a roof assembly within the passenger compartment 826. The trim component 824 includes a recess 830 that is dimensioned to receive the window assembly 822, as indicated in FIG. 19.

As best shown in FIGS. 18 and 19, the window assembly 822 is retractably disposed on the trim component 824, and is movable between an extended position as shown in FIG. 18 and a retracted position as shown in FIG. 19. The window assembly 822 includes a frame 840 that includes a viewing aperture 842, a first panel 844, a second panel 846 and a retracting structure 848.

The frame 840 includes recessed areas that receive and retain the light sources 20, as indicated in FIG. 18. The first panel 844 and the second panel 846 are transparent allowing visibility therethrough. In the depicted embodiment, the first panel 844 and the second panel 846 are laminated together forming a unitary transparent element. However, alternatively, the first panel 844 and the second panel 846 can be separate elements spaced apart from one another. Further, the first panel 844 and the second panel 846 are mounted within the frame 840 such that there is clear visibility through the first panel 844 and the second panel 846 and the viewing aperture 842 of the frame 840 when the window assembly 822 is in the extended position depicted in FIG. 18.

As best shown in FIG. 18, the first panel 844 has a first surface 850. The second panel 846 has a second surface 852. The first surface 850 of the first panel 844 is exposed to the passenger compartment 826. The second surface 852 of the second panel 846 is also exposed to the passenger compartment 826, in particular when the window assembly 822 is in the extended position shown in FIG. 18.

The second panel 846 includes a plurality of switches such as a switch 860. Since details of the manner of operation of the plurality of switches is described above, further description of the switch 860 is omitted for the sake of brevity. The plurality of switches, such as the switch 860 are programmed to operate a variety of features within the vehicle 810, such as air conditioning, fan, radio, DVD/TV, lights, side windows (opening and closing windows). Since the functions of such features in a vehicle are conventional, further description is omitted for brevity.

The window assembly 822 is disposed between the front seats 812 and the back seats 814 of the vehicle 810, as indicated in FIG. 17. Consequently, both the first surface 850 and the second surface 852 of the window assembly 822 face areas of the passenger compartment 826.

The retracting structure 848 includes a pivot axis and mechanism (not shown) that effects movement of the window assembly 822 between the extended position (FIG. 18) and the retracted position (FIG. 19). The retracting structure 848 can include an electric motor (not shown) for automatically moving the window assembly 822 or can include a mechanism that allows for manual movement between the extended position and the retracted position. Since such mechanisms and structures are conventional in nature further description is omitted for the sake of brevity.

It should be understood that the window assembly 822 can be provided within the vehicle 810 in any of a variety of configurations. For example, the window assembly 822 can be included in a divider between the front seats 812 and the rear seats 814. Specifically, where the vehicle 810 is converted into a limousine, the window assembly 822 can be enlarged and serve as a privacy divider separating the front seats 812 from the rear seats 814.

Further, the first panel 844 and/or the second panel 846 of the window assembly 822 can be provided with any of the configurations of indicia and/or etched sections in a manner consistent with the embodiments depicted 13-16.

The controllers 84 and 276 preferably include a microcomputer with a programmable control program that allows the assignment of operation of the switches to specific devices, such as those discussed above. The controllers 84 and 276 can also include other conventional components such as an input interface circuit, an output interface circuit, and storage devices such as a ROM (Read Only Memory) device and a RAM (Random Access Memory) device. The microcomputer of the controllers 84 and 276 is programmed to control the various features assigned to the switches, such as window operation, light operation and signal transmissions to devices in the operator home or office. The memory circuit stores processing results and control programs such as ones for switch operation that are run by the processor circuit. The controllers 84 and 276 are operatively coupled to the vehicle 10 in a conventional manner. The internal RAM of the controllers 84 and 276 stores statuses of operational flags and various control data. The internal ROM of the controllers 84 and 276 stores the instructions necessary for the switches to control the vehicle devices for various ones of the operations described above. It will be apparent to those skilled in the art from this disclosure that the precise structure and algorithms for the controllers 84 and 276 can be any combination of hardware and software that will carry out the functions of the present invention.

The various components of the vehicle 10 and the vehicle 810 other than the window assemblies are conventional components that are well known in the art. Since these components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the window assembly. Accordingly, these terms, as utilized to describe the present invention should be interpreted relative to a vehicle equipped with the window assembly.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle window assembly comprising:
   a vehicle structure defining a passenger compartment of a vehicle and a viewing aperture;
   a window panel mounted to the vehicle structure and covering the viewing aperture such that a first surface of the window panel faces the passenger compartment of the vehicle structure; and
   a proximity switch overlaying a portion of the first surface of the window panel.

2. The vehicle window assembly according to claim 1, wherein
   the first surface of the window panel includes an etched section located proximate the proximity switch.

3. The vehicle window assembly according to claim 2, wherein
   the etched section includes indicia identifying the proximity switch.

4. The vehicle window assembly according to claim 2, further comprising
   a light source mounted to the vehicle structure adjacent to a portion of the peripheral edge of the window panel such that light from the light source is directed to the portion of the peripheral edge of the window panel and laterally through the window panel selectively illuminating the etched section.

5. The vehicle window assembly according to claim 1, wherein
   the window panel is substantially transparent.

6. The vehicle window assembly according to claim 1, wherein
   the proximity switch is substantially transparent.

7. The vehicle window assembly according to claim 1, wherein
   the window panel includes user control indicia printed on the first surface adjacent to the proximity switch.

8. The vehicle window assembly according to claim 1, wherein
   the vehicle structure and a second surface of the window panel define adjacent exterior surfaces of the vehicle.

9. The vehicle window assembly according to claim 1, wherein
   the vehicle structure includes a roof portion that includes the viewing aperture and the window panel to define a sunroof.

10. The vehicle window assembly according to claim 1, wherein
    the vehicle structure includes a door portion that includes the viewing aperture and the window panel to define a window.

11. The vehicle window assembly according to claim 10, wherein
    the door portion includes a main window area and a quarter-window area with the window panel being disposed in the quarter-window area to define a door quarter-window.

12. The vehicle window assembly according to claim 1, wherein
    the window panel is non-movably fixed to the vehicle structure.

13. The vehicle window assembly according to claim 1, wherein
    the proximity switch is provided on a rigid switch panel that is mounted to the first surface of the window panel.

14. The vehicle window assembly according to claim 1, wherein
    the proximity switch is provided on a flexible membrane that is mounted to the first surface of the window panel.

15. The vehicle window assembly according to claim 1, wherein
    the proximity switch is a capacitive switch.

16. The vehicle window assembly according to claim 13, wherein
    the rigid switch panel includes an outer surface that includes a dielectric material.

17. The vehicle window assembly according to claim 1, wherein
    the proximity switch controls brightness of lighting within the vehicle structure.

18. The vehicle window assembly according to claim 1, wherein
    the window panel is an electrochromic panel and the proximity switch controls opacity levels of the electrochromic panel.

19. The vehicle window assembly according to claim 1, wherein
    the vehicle structure includes a window movable between a closed position and an open position, and
    the switch controls the position of the window.

20. The vehicle window assembly according to claim 1, wherein
    the window panel is disposed within the passenger compartment such that both the first surface and a second oppositely facing surface of the window panel face areas of the passenger compartment.

* * * * *